United States Patent [19]

Cros

[11] Patent Number: 5,227,126
[45] Date of Patent: Jul. 13, 1993

[54] INTERNAL STRUCTURE FOR A FAST NEUTRON NUCLEAR REACTOR

[75] Inventor: Alain Cros, Lyons, France
[73] Assignee: Framatome, Courbevoie, France
[21] Appl. No.: 932,565
[22] Filed: Aug. 20, 1992
[30] Foreign Application Priority Data

Aug. 20, 1991 [FR] France ................. 91 10450

[51] Int. Cl.$^5$ ............................................. G21C 9/00
[52] U.S. Cl. ..................................... 376/285; 376/348
[58] Field of Search ............... 376/285, 289, 290, 302, 376/303, 348

[56] References Cited

U.S. PATENT DOCUMENTS

| 4,167,445 | 9/1979 | Aubert et al. | 376/291 |
|---|---|---|---|
| 4,202,552 | 5/1980 | Hirs | 376/285 |
| 4,335,467 | 6/1982 | Robin | 376/285 |
| 4,460,539 | 7/1984 | Andro et al. | 376/285 |
| 4,578,238 | 3/1986 | Artaud et al. | 376/404 |
| 4,744,941 | 5/1988 | Bacher et al. | 376/285 |
| 4,752,436 | 6/1988 | Snyder | 376/285 |
| 4,828,788 | 5/1989 | Terny et al. | 376/285 |

FOREIGN PATENT DOCUMENTS

| 0065912 | 12/1982 | European Pat. Off. . |
|---|---|---|
| 0117802 | 9/1984 | European Pat. Off. . |
| 0150151 | 7/1985 | European Pat. Off. . |
| 2634577 | 6/1989 | France . |
| 61-68586 | 4/1986 | Japan . |

OTHER PUBLICATIONS

Abstract, Soviet Inventions Illustrated, Week K08, 6 Apr. 1983 Derwent publications Ltd., London G.B. & SU-A-920850 (Pavlov).

Primary Examiner—Donald P. Walsh
Assistant Examiner—Frederick H. Voss
Attorney, Agent, or Firm—Pollock, Vande Sande & Priddy

[57] ABSTRACT

The internal structure comprises a bed (5) supporting the core (3) of the reactor and supplying liquid metal to the core, plating (6) resting on the bottom of the main vessel (1) of the reactor and an internal vessel (8) separating the hot collector (12) from the cold collector (13) of the liquid metal. The internal vessel (8) is directly fixed to the upper part of the bed (5) which rests on the plating (6) through the medium of slidable bearing means (21), (22). The bed (5) is connected to means (18) for supplying cooling liquid metal in a zone located at its periphery and outside the internal vessel (8) and the plating (6). Assemblies (31) providing a lateral neutronic protection are fixed to the bed (5) at the periphery of the fuel core (3).

11 Claims, 3 Drawing Sheets

INTERNAL STRUCTURE FOR A FAST NEUTRON NUCLEAR REACTOR

The invention relates to an improved internal structure of a fast neutron nuclear reactor.

Fast neutron nuclear reactors of the integrated type comprise a main vessel enclosing the core of the reactor and an internal structure which are immersed in a liquid metal, usually constituted by sodium, for cooling the core.

Intermediate heat exchangers and pumps for circulating the liquid metal cooling the core are also disposed inside the main vessel which is closed in its upper part by a very thick slab comprising throughway passages through which the exchangers and the pumps are introduced.

The internal structure of the reactor disposed in the main vessel comprises in particular an inner vessel defining a zone of the main vessel receiving the hot liquid metal leaving the core and a zone receiving the cooled liquid metal issuing from the intermediate heat exchangers. The inner vessel comprises generally an assembly of shells coaxial with the main vessel in its upper part and a wall having a generally toroidal shape termed a step shaped area, in its lower part. The heat exchangers and the pumps extend through the step shaped area so that the lower inlet part of the pumps is immersed in the cooled sodium and the intermediate exchangers comprise openings on each side of the step shaped area for ensuring respectively the inlet and the outlet of the liquid metal cooling the core, termed primary fluid, circulating inside the heat exchanger.

The primary fluid circulating inside the heat exchanger is cooled in thermal contact with a secondary fluid generally constituted by a liquid metal such as sodium. The secondary fulid heated by the primary fluid is circulated inside the intermediate heat exchangers and in a secondary circuit outside the main vessel of the reactor on which steam generators are disposed.

Internal vessels of fast neutron neuclear reactors are known which have a step shaped area constituted by a single wall of toroidal shape whose meridian may have for example the shape of an ogive.

In a reactor of known type at present in use, the plating resting on the bottom of the vessel supports the bed on which are fixed the fuel assemblies of the core and a false bed disposed around the bed on which rest the elements providing the lateral neutronic protection of the reactor.

The lower part of the step shaped area of the inner vessel is fixed to the plating and the bed is supplied with hot liquid metal coming from the pumps, through piping extending through the plating in radial directions. Sealing devices are placed between the supply piping and the plating and between the bed and the support of the bed.

The fact that the supply piping of the bed must extend through the plating, or possibly through the lower part of the inner vessel, complicates the design of the reactor and requires use of sealing devices such as bellows in the region of the passages of the piping to permit maintaining the pressure difference between the part of the vessel receiving the hot liquid sodium, or hot collector, and the part of the vessel receiving the cooled liquid, or cold collector.

The lateral size of the sealing devices and of an intermediate support structure such as a bed support renders the design of the primary circuit of the reactor more difficult and results in radial dimensions of the elements of the reactor, and in particular of the main vessel, which may be large.

The sealing devices which must be provided between the bed and the support element of the inner vessel such as the plating, for conducting the leakage flow of the primary fluid necessary for the cooling of the main vessel, may have a complex structure.

Further, zones are formed around the bed in which the primary sodium is practically stagnant or flows at a low rate; the existence of these zones results in complex thermal stresses on the structures of the reactor during the transitional operating periods of the reactor.

A first solution has been envisaged and disclosed in particular in the document FR-A-2,558,635. This solution consist in using a complex structure performing the functions of both the bed and the plating. However, it is still necessary in the case of such a structure to provide a lateral connection and a sealed passage for the primary sodium supply piping of the core. Further, the design of such a integrated structure which is heavy and hyperstatic may be complex; the hyperstatic nature of the structure renders it incapable of following in a satisfactory manner the thermal transitional periods in the course of the operation of the reactor. Lastly, the design of an integrated structure presents drawbacks when assembling or adjusting the reactor unit.

An object of the invention is therefore to provide an internal structure of a fast neutron neuclear reactor comprising a main vessel enclosing the core of the reactor and the internal structure which are immersed in a liquid metal for cooling the core, the internal structure comprising an internal vessel defining a zone of the main vessel receiving the hot liquid metal issuing from the core and a zone receiving the cooled liquid metal and comprising a single wall or step shaped area of substantially toroidal shape in its lower part, a support element for the assemblies of the core and for feeding and distributing the liquid cooling metal in the core, termed bed, and a support element for the bed, or plating, resting on the bottom of the main vessel, said internal structure of being of simple design and avoiding the drawbacks of the aforementioned devices of the prior art.

For this purpose, this step shaped area of the internal vessel is directly fixed by welding in its lower part to the upper part of the bed and the bed is connected to means for supplying cooling liquid metal in a zone located at its periphery and outside the internal vessel and the plating and rests on the plating through the medium of sliding supports one of which is located on the periphery of the bed and provides a cooling metal seal between the bed and the plating.

In order to explain the invention, there will now be described, by way of a non-limitative example with reference to the accompanying drawings, an embodiment of an internal structure of a fast neutron nuclear reactor cooled by liquid sodium according the the invention.

Figure 1:
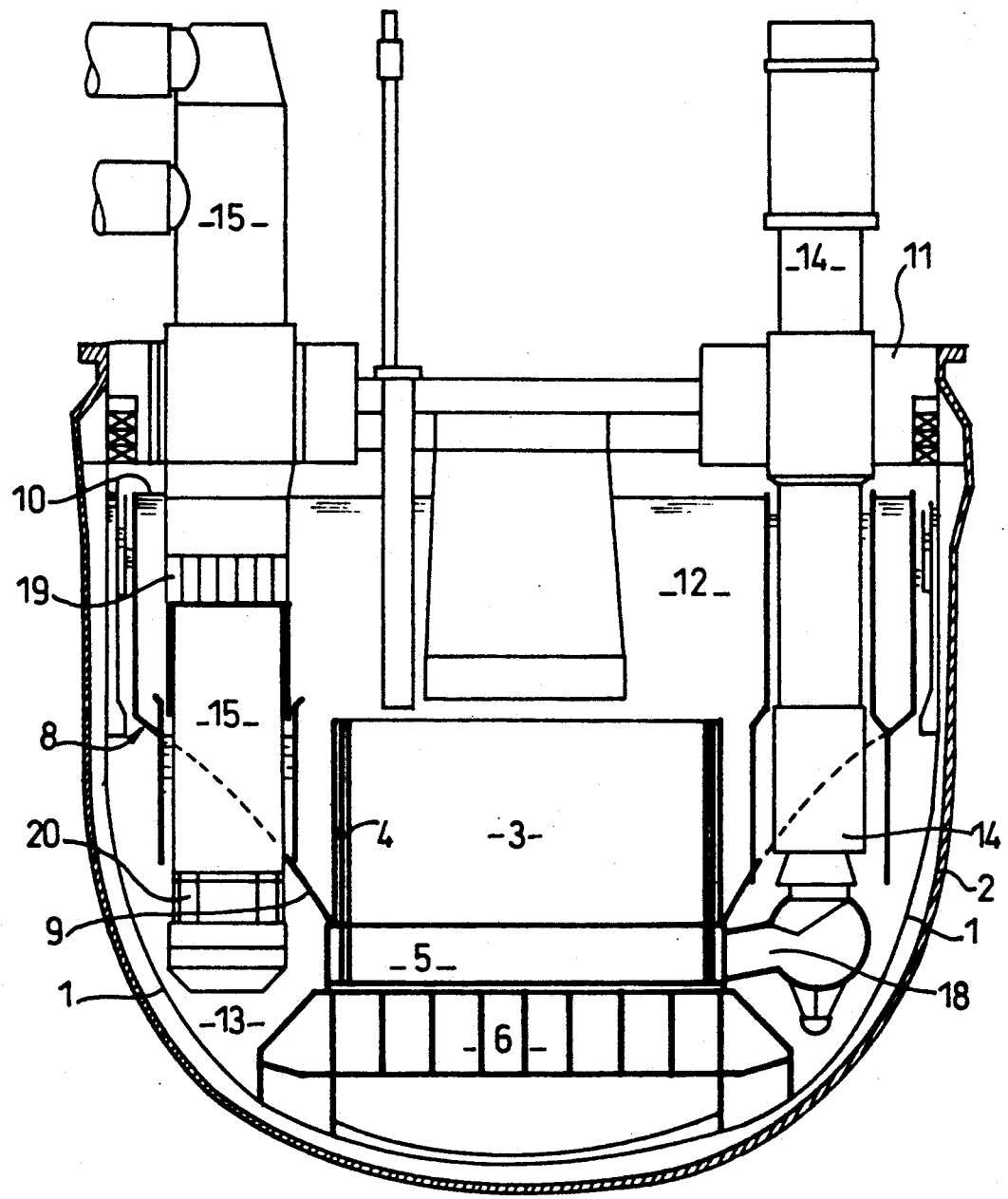
FIG. 1 is a sectional view in a vertical plane of the main vessel of a fast neutron nuclear reactor comprising an internal structure according to the invention.

FIG. 1 shows the main vessel 1 of a fast neutron nuclear reactor lined externally by a safety vessel 2 and enclosing the core 3 of the reactor constituted by fuel assemblies of prismatic shape disposed vertically and side by side. The fuel assemblies 4 are engaged by their lower part in a bed 5 which maintains the fuel assemblies in vertical position. The bed 5 rests on a plating 6 which rests on the bottom of the main vessel 1 of the reactor.

The main vessel 1 of the reactor comprises a substantially cylindrical part and a curved convex bottom formed by part-spherical case portions welded together.

The internal vessel 8 of the reactor is constituted in its upper part by an assembly of coaxial shells which have a common axis corresponding to the axis of the main vessel and define therebetween different annular containers for the primary liquid sodium cooling the main vessel.

In the central part of the vessel defined by the internal vessel 8, the primary liquid sodium has an upper level 10 which may vary between certain limits as a function of the operating stages of the reactor.

The lower part 9 of the internal vessel constituting the step shaped area is made in the form of a single wall of toroidal shape whose meridian shown in FIG. 1 has the shape of an ogive.

The internal vessel 8 defines, inside the main vessel 1, a first zone 12 located inside the internal vessel 8 and enclosing the core 3 of the reactor, and a second zone 13 located outside the internal vessel 8 below the step shaped area 9.

The first zone 12 constituting the hot collector of the reactor contains the primary liquid sodium, heated in contact with the core 3, up to the upper level 10.

The step shaped area 9 of the internal vessel comprises openings for the passage of the primary pumps 14 and the intermediate exchangers 15 in the region of which the wall of the step shaped area is connected to shells providing sealed passages for the pumps and the exchangers and isolation of the liquid sodium contained in the hot collector 12 from the liquid sodium contained in the cold collector 13.

The vessel 1 of the reactor is closed in its upper part by a very thick slab 11 provided with throughway openings for the passage of the pumps 14 and the heat exchangers 15.

In the case of a 1500 MW fast neutron nuclear reactor, the primary circuit of the reactor permitting the circulation of the primary cooling liquid sodium of the core comprises three primary pumps 14 spaced 120° apart around the axis of the vessel, and six intermediate heat exchangers interposed between the primary pumps.

Each of the primary pumps 14 is laterally connected by a discharge piping 18 directly to the bed 15 on which the assemblies of the core 3 rest. The primary liquid sodium, taken by the pumps 14 from the cold collector 13, is discharged inside the bed 5 which ensures the distribution of the sodium cooling the core in each of the assemblies 4.

The sodium injected at the base of the core passes through the assemblies upwardly in the vertical direction and issues from the core in the hot collector 12. The intermediate exchangers 15 comprise an upper opening 19 through which the hot sodium enters the heat exchanger and a lower opening 20 through which the sodium cooled inside the heat exchanger enters the cold collector 13.

There will now be described with reference to FIG. 2 the internal structure of the nuclear reactor comprising the internal vessel 8, the bed 5 and the plating 6.

The plating 6 and the bed 5 are constituted by mecanowelded structures whose strength is so calculated as to withstand the forces applied thereto and in particular the weight of the core 3.

The plating 6 resting on the bottom of the main vessel 1 has a structure which is substantially identical to the structure of platings of the prior art.

The bed 5, constructed in the form of a cylindrical box structure of small height, rests on the upper surface of the plating 6 through the medium of a circular bearing flange 22 downwardly extending the outer lateral wall of the cylindrical bed 5. Spherical bearing means 21 are also interposed between the lower surface of the bed 5 and the upper surface of the plating 6.

As will be explained hereinafter, the circular flange 22 and the spherical bearing means 21 constitute sliding supports allowing a certain displacement of the structure of the reactor in the event of earthquakes or thermal transitional periods accompanied by expansions or retractions of certain parts of the structure.

In its central part, the upper wall of the plating 6 comprises an opening in the region of which is fixed a flange 45 and an adjusting packing piece co-operating with a pivot 25 connected to the lower part of the bed 5.

When the bed 5 is in position on the plating 6, the pivot 25 engaged in the flange 45 prevents lateral displacements between the bed 5 and the plating 6.

A key 27 preventing rotation is placed at the periphery of the bed so as to avoid any rotation of the bed with respect to the plating about an axis coincident with the axis of the vessel.

The lower annular flange 22 of the bed 5 ensures a certain sealing with respect to the cooling liquid sodium of the reactor. It rests on an adjusting packing piece 35 for achieving the correct attitude of the bed when mounting.

The major part of the flow of liquid sodium discharged into the bed 5 through the piping 18 (arrow 28) enters through the base of the core for cooling the fuel assemblies (arrow 29).

A small part of this flow constituting a leakage flow is directed downwardly toward the plating 6 (arrow 30).

Owing to the presence of the annual flange 22 providing a seal in the contact between the bed and the plating at the periphery of the bed, the flow 30 passes through the plating and reaches the vicinity of the bottom of the vessel where this flow is recovered and flows in contact with the inner wall of the main vessel 1 and cools this wall.

The step shaped area 9 constituting the lower portion of the internal vessel 8 is directly welded, in the region of its lower end, to the peripheral portion of the bed 5. The assemblies constituting the lateral neutronic protection 31 of the reactor disposed around the core 3 formed by fuel assemblies rest directly on the upper part of the bed 5.

In fact, the absorbent assemblies of the lateral neutronic protection 31, as well as the fuel assemblies of the core 3, each comprise a foot which is engaged in a pillar of corresponding shape fixed in the box structure of the bed 5.

Figure 3:
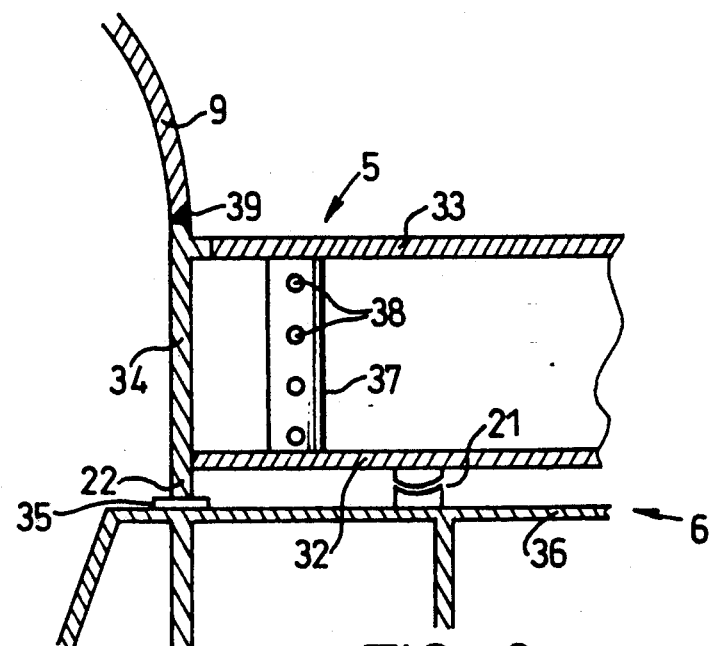
FIG. 3 is a detail sectional view in a vertical plan of an outer peripheral part of the internal structure shown in FIG. 2.

FIG. 3 shows a part of the bed 5 made in the form of a cylindrical box structure comprising a lower sole 32 and an upper sole of circular shape, which are parallel to each other and fixed at their periphery to a cylindrical shell constituting the outer wall of the bed.

The lower portion of the outer shell 34 constitutes the annular flange 22 supporting the bed resting on a packing piece 35 which adjusts the position of the bed and bears on the upper sole 36 of the plating 6.

There is also shown a pillar 37 for fixing an assembly constituted by a tubular element fixed in its lower part to the lower sole 32 of the bed and, in its upper part, to the upper sole 33 in the region of an opening extending through the upper sole of a cavity machined in the lower sole.

The pillars 37 of the bed 5 receiving the fuel assemblies comprise openings 38 in their lateral wall for the passage of the sodium cooling the fuel assemblies.

The pillars receiving the assemblies providing the lateral neutronic protection of the reactor do not include said lateral openings 38.

The lower end of the step shaped area 9 of the internal vessel 8 is fixed by welding 39 to an attendant part of the outer shell 34 of the bed projecting above the upper sole 33.

The spherical bearing means 21 through which the bed bears against the plating constitute localized bearing devices arranged over the area of the lower sole 32 and comprise a spherical male part connected to the lower surface of the sole 32 of the bed and a spherical female part connected to the upper sole 36 of the plating 6. The annular flange 22 and the packing piece 35 on one hand and the spherical bearing devices 21 on the other constitute slidable bearing means whereby it is possible to absorb forces exerted in the transverse direction between the bed and the plating in the event of an earthquake and the expansions occurring in the course of transitional operation periods of the reactor.

Figure 4:
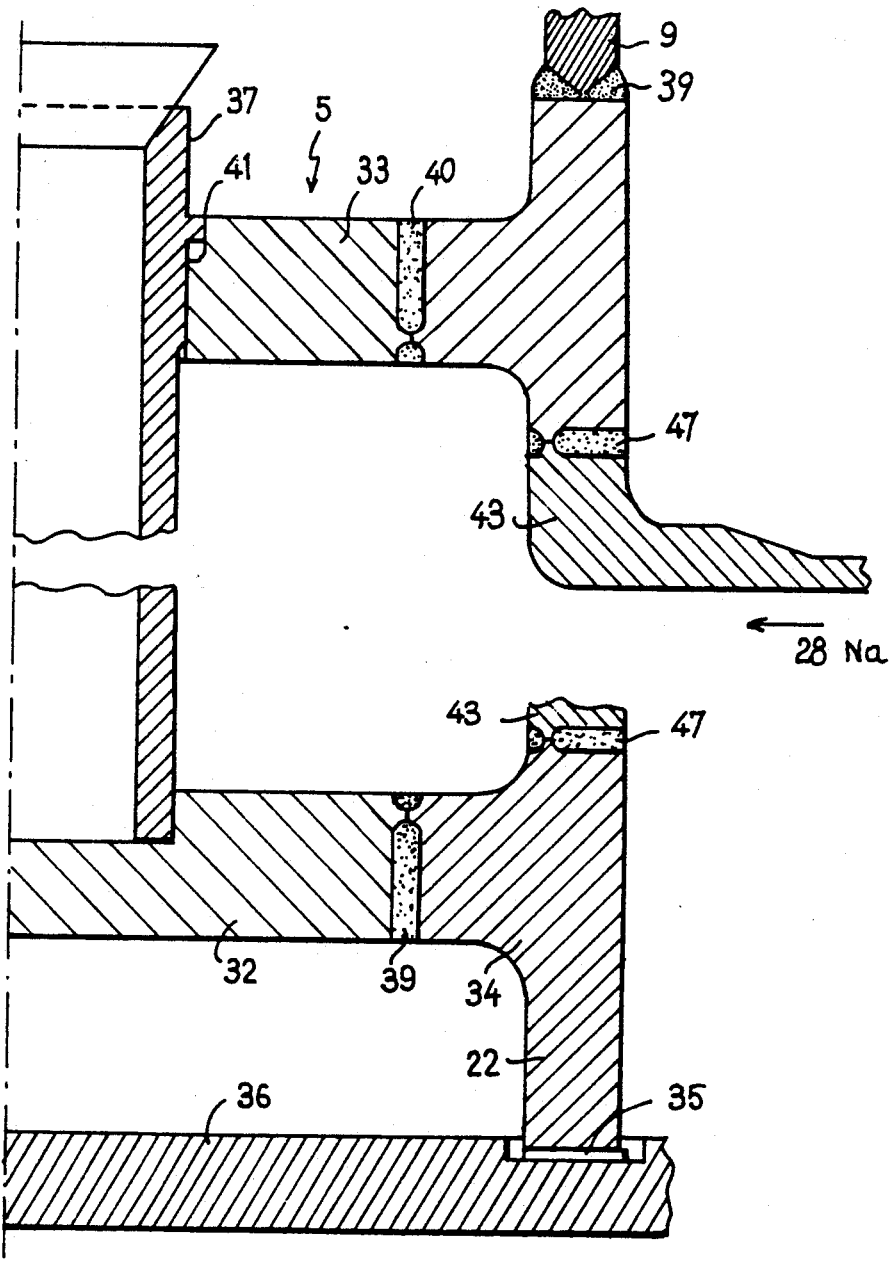
FIG. 4 is a detail view to a larger scale of the welding zones of a part of the structure shown in FIG. 3.

FIG. 4 is a partial view of the outer portion of the bed 5.

The outer shell 34 of the bed 5 comprises an upper portion constituting an attendant welding portion on which is fixed, by a weld joint 39, the lower end of the step shaped area 9. The shell 34 also includes two portions of annular shape which project inwardly and are machined so as to constitute with corresponding machinings provided on the peripheral surface of the circular soles 32 and 33, welding chamfers 39 and 40 which are filled with welding metal upon the assembly of the box structure constituting the bed 5.

A pillar 37 is also shown which supports an assembly of the lateral neutronic protection and is fixed inside an opening extending through the upper sole 33 of the bed, by a weld 41 achieved by laser welding and engaged in a blind opening machined in the lower sole 32 of the bed.

The annular flange 22 constituting the lower portion of the outer shell 34 of the bed and including a hard layer on its lower surface rests on the upper sole 36 of the plating through the medium of an adjusting packing piece 35 covered with a hard layer achieved by aluminization or formed by chromium nitride. This packing piece lies in an annular cavity machined in the upper sole of the plating.

In this way it is possible for the bed to slide to a limited extent relative to the plating with a reduced wear of the parts in contact with one another.

Further, the contacting surfaces of the annular flange 22 and the upper sole 36 of the plating are perfectly planar thereby providing a fluidtight closure of the space between the bed and the upper surface of the plating which is consequently isolated from the cold collector 13. This space constitutes a part of the leakage collector receiving the liquid sodium cooling the inner wall of the main vessel.

Nozzles, such as the nozzle 43, provided for connecting piping 18 supplying cooling liquid sodium are fixed by welding with a welding metal in the region of openings extending through the outer shell 34 of the bed 5.

Figure 2:
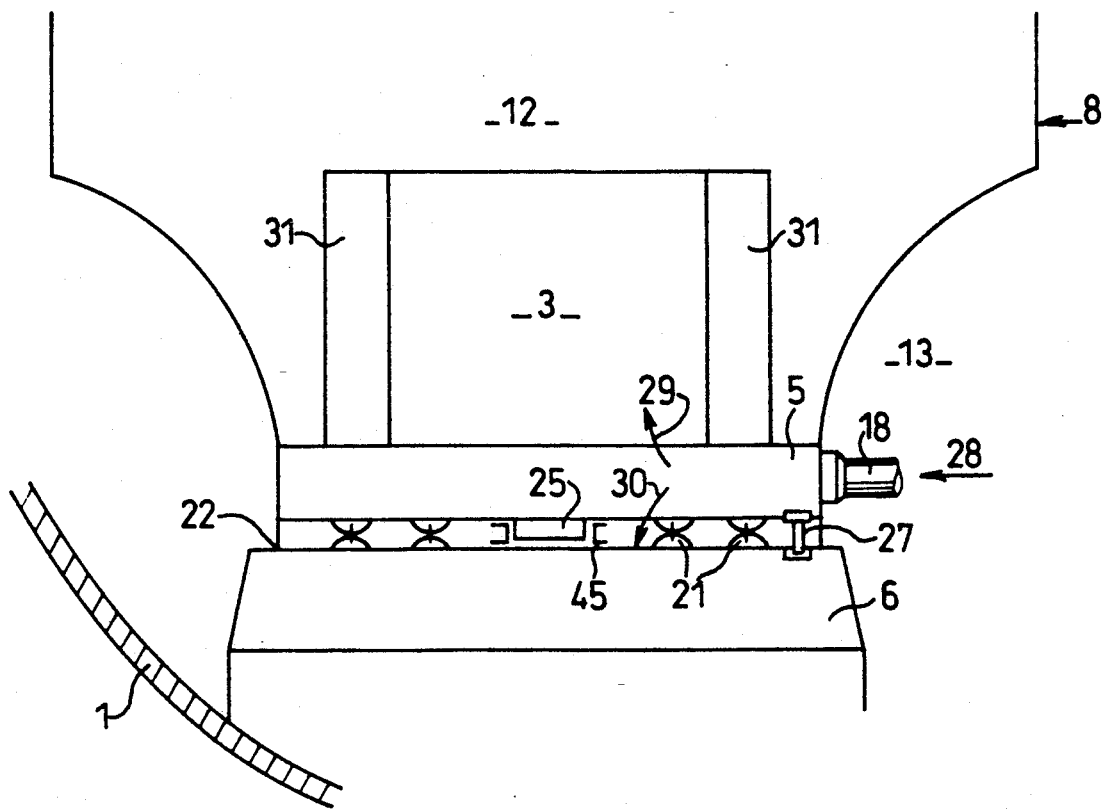
FIG. 2 is a diagrammatic view of the internal structure of the reactor shown in FIG. 1.

As is shown in FIG. 2, the pipings 18 are directly connected to the outer shell of the bed 5 in zones located outside the inner vessel 8 and the plating 6. In this way, the use of deformable sealed passage devices such as bellows is avoided.

Figure 5:
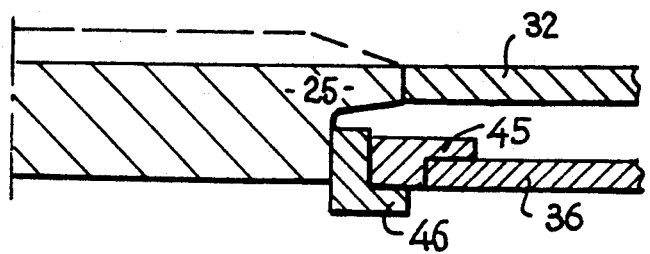
FIG. 5 is a detail view in section in a vertical plane of the central part of the internal structure shown in FIG. 2.

FIG. 5 shows the central portion of the bed comprising the pivot 25 connected to the lower sole 32.

The upper sole 36 of the plating 6 has an opening in its central portion along the edge of which is fixed a flange 45 whose inner bore receives the pivot 25 with interposition of an adjusting packing piece 46.

The adjusting packing piece 46 is machined when mounting the internal structure of the reactor.

The pivot 25 has a diameter which is defined as a function of earthquake forces which are liable to be exerted on the structure of the reactor and capable of bringing about a lateral displacement between the plating and the bed, and as a function of the spacing between the lower surface of the sole 32 of the bed and the upper surface of the sole 36 of the plating.

This spacing may be fixed at a small value and is usually around 80 mm.

The central pivot resists not only the forces occurring during an earthquake but also the forces due to thermal dissymmetries inside the vessel of the reactor.

The bed may be made from an outer forged shell on which the nozzles for the piping are fixed by welding, and soles formed by circular planar plates fixed by welding to the outer shell.

The outer shell may be formed by a weld-less single forged element or by a plurality of forged shell sections welded together.

The outer shell could also be made from a thick sheet or plate.

Note that in the case of the structure according to the invention, the step shaped area of the internal vessel is directly fixed to the bed through which the core is supplied with cooling fluid. In the case of devices of the prior art, the step shaped area of the internal vessel was usually fixed to a structure supporting the bed, such as plating.

Further, the seal between the bed and the plating is achieved by a sliding annular peripheral bearing element and not by flexible sealing elements. Greater strength and greater reliability of the device according to the invention result.

The assemblies of the lateral neutronic protection of the reactor are supported by the bed itself in a manner identical to the fuel assemblies constituting the core and not by an additional structure such as a false bed.

The device according to the invention has in particular the advantage of being less complex and having fewer component parts and a simpler shape than the devices of the prior art.

For a higher reactor power, the radial size of the structure according to the invention is markedly reduced so that there is a substantial reduction in the diameter of the internal vessel and of the main vessel of the reactor.

The use of deformable or flexible sealing means such as bellows or strips is also avoided so that the reliability of the device is improved and the time required for its assembly distinctly reduced.

The formation of zones in which the cooling liquid metal is stagnant or flows at a low rate is also avoided.

There is an improved thermal behavior of the structure during the transitional periods of operation of the reactor.

The various parts of the structure according to the invention are more readily accessible for inspection or repairs.

The amount of steel required for the construction according to the invention is distinctly less than the corresponding amount of the devices of the prior art. The saving in the amount of steel required for the construction of the internal structure of the reactor is of great importance in particular owing to the fact that the structure must be made from stainless steel.

The scope of the invention is not intended to be limited to the embodiment described.

Thus there may be envisaged a structure comprising a bed having a shape different from that described and bearing and retaining means between the bed and the plating different from those described.

The step shaped area of the internal vessel may have a shape different from that described. However, this step shaped area must be formed by a single wall which may be connected by welding to the upper part of the bed.

The structure according to the invention may be employed in the case of any fast neutron nuclear reactor of integrated type cooled by a liquid metal.

What is claimed is:

1. Internal structure of a fast neutron nuclear reactor comprising a main vessel, a core of said reactor and said internal structure being contained in said main vessel and immersed in a liquid metal for cooling said core, said internal structure comprising an internal vessel defining a zone of said main vessel for receiving hot liquid metal leaving said core and a zone for receiving cooled liquid metal, said internal vessel comprising a step shaped area having a substantially toroidal shape in the lower part thereof, a support element, termed a bed, for assemblies of said core and for the supply and distribution of said cooling liquid metal in said core, and a support element, termed plating, for supporting said bed and resting on a bottom of said main vessel, said step shaped area of said internal vessel having a lower portion directly fixed by welding to an upper part of said bed, means connected to said bed for supplying cooling liquid metal in a zone located at the periphery of said bed and outside said internal vessel and outside said plating, slidable bearing means interposed between said bed and said plating, said bed resting on said plating through the medium of said slidable bearing means, one of said slidable bearing means being located at the periphery of said bed and ensuring a sealing of said cooling liquid metal between said bed and said plating.

2. Internal structure according to claim 1, wherein said step shaped area of said internal vessel is constituted by a single wall.

3. Internal structure according to claim 1, comprising absorbent assemblies constituting a lateral neutronic protection of said reactor and fixed directly on said bed at the periphery of said core.

4. Internal structure according to claim 1, wherein said slidable bearing means comprise an annular bearing flange connected to a peripheral portion of said bed and a plurality of spherical bearing devices interposed between said bed and said plating.

5. Internal structure according to claim 1, further comprising a flange connected to said plating, and a central pivot connected to said bed and engaged in said flange for ensuring a transverse maintenance of said bed relative to said plating.

6. Internal structure according to claim 5, comprising a locking key engaged in an upper sole plate of said plating for locking said bed against rotation relative to said plating.

7. Internal structure according to claim 1, wherein said bed is constructed in the form of a cylindrical box structure which comprises an outer shell, a circular lower sole and a circular upper sole which are fixed by the periphery therof to said outer shell.

8. Internal structure according to claim 7, wherein said outer shell of said bed comprises an upper annular portion which projects from said upper sole, and said step shaped area of said inner vessel has an end which is welded onto said upper annular portion.

9. Internal structure according to claim 7, wherein said outer shell of said bed comprises an annular lower portion which projects below said lower sole, constitutes said peripheral slidable bearing means and rests on said plating through the medium of an adjusting packing piece.

10. Internal structure according to claim 9, comprising a hard covering provided on a lower bearing surface of said lower annular portion of said outer shell and on a respective bearing surface of said packing piece.

11. Internal structure according to claim 7, wherein said means for supplying cooling liquid metal to said bed comprise at least one piping connected to a respective nozzle welded to said outer shell around a throughway opening in said outer shell.

* * * * *